Patented Apr. 9, 1940

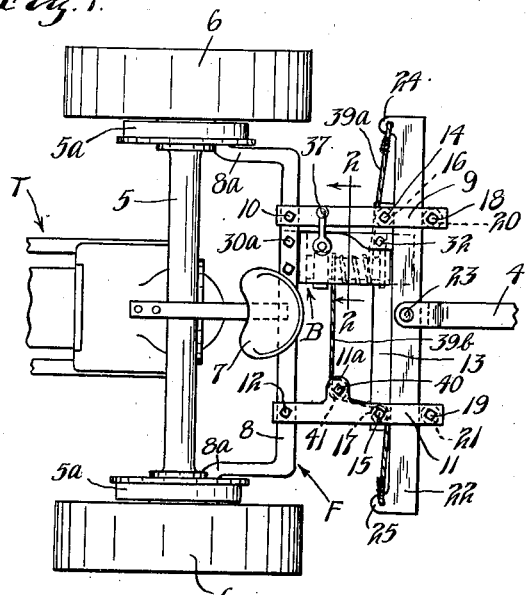

2,196,410

UNITED STATES PATENT OFFICE 2,196,410

ADJUSTABLE DRAFT HITCH FOR TRACTORS

Neil Corey, Winona, Minn., assignor of one-fourth to George Fitting, Houston, Minn.

Application May 15, 1939, Serial No. 273,623

2 Claims. (Cl. 280—33.10)

My invention relates to draft hitches for interconnecting vehicles and particularly to adjustable hitches for connecting a farm tractor to an implement towed thereby.

In operation of farm tractors and implements towed thereby it is quite frequently necessary to travel on sloping ground in a direction other than parallel to the direction of slope of the ground and also to travel along a line passing over ground which is level in some portions and sloping in various directions in other portions. On level ground the towed implement will maintain a position directly behind the tractor but on ground sloping other than parallel to the line of travel the towed implement will tend to be deflected from said position toward one side or the other. Hitches have been devised enabling adjustive movement of the point of connection of an implement to a tractor transversely of the tractor but many of such hitches have been unduly complicated or cumbersome, too easily subject to damage or have required employment of two control elements of which one is for causing adjustive movement and the other is for locking the hitch in an adjusted position.

An object of my invention is to provide an adjustable tractor hitch wherein only a single control element is required for use in adjusting the hitch and wherein the hitch is automatically locked in any adjusted position thereof without the need for any locking means requiring locking and releasing operations.

Another object is to provide such a hitch wherein the adjustively movable portion may be adjustively moved, within its range of movement, through any desired distance, however small, and still be automatically locked in any position in which it is adjustively placed.

A further object is to provide such a hitch of particularly simple, light, compact, rugged and inexpensive construction.

These and other objects and advantages of the invention will more fully appear from the following description made in connection with the accompanying drawing, wherein like reference characters refer to the same or similar parts throughout the various views, and in which:

Fig. 1 is a top view of an embodiment of my invention shown in operative relation with the rear portion of a tractor and the forward end of the tongue or towing bar of a towed vehicle such as an agricultural implement;

Fig. 2 is a sectional view taken along the line 2—2 of Fig. 1, as indicated by the arrows; and Fig. 3 is a sectional view taken along the line 3—3 of Fig. 2, as indicated by the arrows.

Referring to the drawing, the illustrated embodiment of my invention is shown in operative association with a tongue or towing bar 4, such as that customarily provided on the forward end of a farm implement, and a farm tractor T having the usual rear axle 5, traction wheels 6 and operator's seat 7. Although my device may be attached to any suitable non-rotating portion of the rear end of a tractor I have shown enlarged portions 5a on the respective ends of the rear axle 5 to which, for purposes of illustration, my device is shown as attached. The portion of a tractor to which my device is attached in practice and the manner in which it is attached will, of course, be determined by the construction of the tractor with which my device is used.

My adjustable tractor hitch device includes a frame F including structure suitably arranged to enable securing thereof to the rear end of a tractor. The illustrated form of my device includes a generally U-shaped member 8 having respective legs 8a extending forwardly and, at their forward or free ends, being rigidly secured to suitable respective portions of the rear end of a tractor, such as the enlarged portions 5a at the ends of the rear axle 5, as indicated in the drawings, in a suitable manner.

The frame F includes, near the right-hand end thereof, a pair of frame elements 9 extending rearwardly from the frame member 8, the forward ends of the elements 9 being disposed one above and one below the frame member 8 and secured thereto by suitable means such as a bolt 10. Near the left-hand end of the frame member 8 a second pair of frame elements 11, generally similar to the frame elements 9, are associated with the frame member 8 in the same manner as the frame elements 9 and are similarly secured to the frame member 8 by means of a bolt 12 extending through suitably apertured portions of the secured parts. A cross-bar or brace 13, disposed parallel to the main or medial portion of the frame member 8 and spaced rearwardly thereof by a substantial distance, extends from the frame members 9 to the frame members 11 and, in its respective end portions, underlies the lower one of the frame elements 9 and the lower one of the frame elements 11. At the intersections of the brace 13 with the lower frame elements 9 and 11 the brace 13 and both the upper and lower ones of the frame elements 9 and 11 are apertured to permit extension of a bolt therethrough. The apertured portions of the lower frame elements 9 and 11 are each internally screw-threaded to receive the screw-threaded portion of a bolt. Bolts 14 and 15 are extended downwardly through the respective above-mentioned series of apertured portions and are screw-threadedly engaged in the screw-threaded portions of the respective lower ones of the frame elements 9 and 11. Nuts or burrs (not shown) are placed on the lower ends of the screw-threaded portions of the bolts 14 and 15 to secure the ends of the brace 13 to the lower ones of the frame elements 9 and 11. Circumferentially grooved rollers 16 and 17 are rotatably mounted on the portions of the respective bolts 14 and 15 disposed in the spaces between the upper and lower ones of the frame elements 9 and the upper and lower ones of the frame elements 11. At a moderate distance rearwardly of the respective bolts 14 and 15 other bolts 18 and 19 extend through suitably apertured portions of the upper and lower frame elements 9 and of the upper and lower frame elements 11. Rollers 20 and 21 are rotatably mounted on the medial portions of the respective bolts 18 and 19 so as to be disposed in the spaces between the upper and lower ones of the frame elements 9 and 11.

I provide a draft bar 22 extending transversely of the tractor T and carried by the frame F for longitudinal movement relative thereto. The draft bar 22 extends through the space between the upper and lower frame elements 9 and the space between the upper and lower frame elements 11 so that the forward edge of the bar 22 will be closely adjacent the rollers 16 and 17 and the rearward edge will lie against the rollers 20 and 21. The medial portion of the bar 22 is provided with any desired type of means for connection thereto of a suitable part, such as the tongue or towing bar 4, of a vehicle or implement to be towed by the tractor T. For this purpose I have illustrated the bar 22 as having a bolt 23 carried by a suitably apertured portion 22a of the bar 22 and adapted to be extended through an apertured portion of a member such as the implement tongue 4. The ends of the bar 22, at their forward edges are provided with apertured lugs 24 and 25 for a purpose which will be explained.

Means accessible for manipulation by an operator occupying the tractor seat 7 and operable for adjustively shifting the draft bar longitudinally is mounted on the frame F. A box B having front and rear walls 26 and 27 and top and bottom walls 28 and 29, is provided with front and rear flanges 30 and 31. The front flange is secured to the lower side of the frame member 8 by suitable means such as the bolts 30a and the rearward portion of the bottom wall 27 is secured to the upper side of the brace 13 by suitable means such as the bolt 32. A windlass spool or drum 33 carrying a worm wheel 34 on its forward end and having trunnions or stub shafts 35 on its respective forward and rearward ends is rotatably mounted in the box B by journalling the stub shafts 35 in suitably apertured portions of the respective front and rear walls 26 and 27 of the box B. A vertical shaft 36, carrying an operating crank 37 on its upper end accessible from the tractor seat 7 is journalled in its lower portion in suitable apertures formed in the respective upper and lower walls 28 and 29 of the box B. Between the upper and lower box walls 28 and 29 a worm 38 is mounted on the shaft 36 and is in mesh with the worm wheel 34 on the windlass spool 33 so that the windlass spool may be rotated by manipulating the crank 37.

A flexible, elongated tension element 39 such as a flexible steel rope or cable is wrapped helically around the windlass spool 33 for frictional engagement therewith and has respective end portions 39a and 39b extending to and connected with the respective apertured lugs 24 and 25 formed on the ends of the draft bar 22. The cable portion 39a is trained over the grooved roller 16 to be guided thereby. The frame elements 11 have apertured lugs 11a formed thereon as shown and through which a bolt 40 extends. Between the upper and lower ones of the lugs 11a a circumferentially grooved pulley 41 for guiding the cable portion 39b is rotatably mounted on the medial portion of the bolt 40. The cable portion 39b is trained over the grooved roller 41 and then over the grooved roller 17, as shown in Fig. 1, in its path from the windlass spool 33 to the apertured lug 25. In extending over the grooved roller 17 the cable portion 39b is, of course, situated in the groove of the roller 17 and hence has clearance from the forward edge of the draft bar 22.

The pitch of the worm 38 is so selected that the worm 38 and the worm wheel 34 together form an irreversible transmission mechanism for transmitting rotative movement from the crank 37 to the windlass spool 33 and accordingly functions as automatic means for normally restraining the windlass spool 33 from rotation. It is, of course, readily seen that the draft bar 22 will be shifted longitudinally, that is transversely of the tractor responsive to rotative movement of the crank 37. When the tractor and an implement towed thereby are traveling along a line where the ground may be level in portions and may slope in various directions in other portions the crank 37 may be easily and quickly operated to shift the draft bar into various suitably adjusted positions in order to compensate for the tendency of the towed vehicle to swing to one side or the other of a position directly behind the tractor as sidewardly sloping ground is encountered. With my device there is no locking means which must be released prior to each adjusting operation and reset following each adjusting operation, and yet the draft bar is always restrained from any movement out of an adjusted position thereof except such movements as are purposely caused by manipulation of the crank 37. Also, my device enables adjustive movement of the draft bar through any desired distances within the range of the device rather than through only predetermined distances or multiples thereof.

It is apparent that I have invented a novel, simple, light, compact, rugged and inexpensive form of adjustable tractor hitch capable of particularly convenient, easy and flexible operation thereof.

It will, of course, be understood that various changes may be made in the form, details, arrangement and proportions of the various parts without departing from the scope of my invention.

What is claimed is:

1. An adjustable draft hitch having in combination, a frame attachable to the rear end of a draft vehicle including laterally spaced pairs of rearwardly projecting members, the members of each of said pairs being vertically aligned in spaced relation to form a guide for an object placed therebetween, a bar extending laterally of said frame through the interior spaces of said pairs of members in laterally slidable relation therewith, the medial portion of said bar being arranged for connection of a towed vehicle thereto, elements carried by said respective pairs of members and blocking rearward movement of said bar relative thereto, a winch drum rotatably mounted in said frame with its rotational axis disposed horizontally and extending forwardly and rearwardly, an elongated flexible element wrapped about the periphery of said drum and having ends connected to the respective ends of said bar, a worm wheel associated with said drum in non-rotatable relation therewith, a vertical shaft journalled in said frame and projecting thereabove, a worm on said shaft meshed with said worm wheel, and means on the upper end of said shaft for use in manually rotating the same.

2. An adjustable draft hitch having in combination, a frame member disposable horizontally and laterally of the rear end of a draft vehicle and arranged for attachment thereto, two pairs of secondary frame members projecting horizontally rearwardly from widely spaced portions of said first mentioned frame member, the respective members of each of said pairs being in vertically spaced alignment to constitute a guide for an object in the space between said respective members, a bar extending through and beyond said guides for longitudinal sliding movement therein, means in the spaces of said guides rearwardly of said bar for blocking rearward displacement of said bar in said guides, a box having front, rear, bottom and top walls carried by said members, a winch drum rotatably mounted in said box with its rotational axis disposed horizontally and extending forwardly and rearwardly, an elongated flexible element wrapped about the periphery of said drum and having ends connected to the respective ends of said bar, a worm wheel non-rotatably associated with said drum, a vertical shaft journalled in the top and bottom walls of said box, a worm on said shaft meshed with said worm wheel, and means on the upper end of said shaft for use in manually rotating the same, the central portion of said bar being arranged for connection of a towed vehicle thereto.

NEIL COREY.